United States Patent

Urata

(10) Patent No.: US 9,462,297 B2
(45) Date of Patent: Oct. 4, 2016

(54) IMAGE PROCESSING DEVICE AND IMAGE PROCESSING METHOD

(71) Applicant: Sony Corporation, Tokyo (JP)

(72) Inventor: Kaoru Urata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/628,795

(22) Filed: Feb. 23, 2015

(65) Prior Publication Data

US 2015/0281737 A1 Oct. 1, 2015

(30) Foreign Application Priority Data

Mar. 31, 2014 (JP) ................................. 2014-073033

(51) Int. Cl.
| | |
|---|---|
| G06K 9/36 | (2006.01) |
| H04N 19/60 | (2014.01) |
| H04N 19/124 | (2014.01) |
| H04N 19/176 | (2014.01) |
| H04N 19/44 | (2014.01) |

(52) U.S. Cl.
CPC ............ *H04N 19/60* (2014.11); *H04N 19/124* (2014.11); *H04N 19/176* (2014.11); *H04N 19/44* (2014.11)

(58) Field of Classification Search
CPC .. H04N 19/124; H04N 19/176; H04N 19/44; H04N 19/60; H04N 19/91
USPC ........................................... 382/232–233, 248
See application file for complete search history.

(56) References Cited

U.S. PATENT DOCUMENTS

| | | | | |
|---|---|---|---|---|
| 6,067,383 | A  * | 5/2000 | Taniguchi | G06F 17/14 348/390.1 |
| 6,411,229 | B2 * | 6/2002 | Kobayashi | 341/63 |
| 6,757,437 | B1 * | 6/2004 | Keith | G06F 17/148 375/E7.016 |
| 8,098,947 | B2 * | 1/2012 | Fukuhara | H04N 19/63 382/239 |
| 8,363,969 | B1 * | 1/2013 | Wang | H04N 19/30 382/251 |

FOREIGN PATENT DOCUMENTS

| | | |
|---|---|---|
| JP | 2000-184204 | 6/2000 |
| JP | 2003-169333 | 6/2003 |

OTHER PUBLICATIONS

U.S. Appl. No. 14/630,153, filed Feb. 24, 2015, Urata.

\* cited by examiner

*Primary Examiner* — Kanjibhai Patel
(74) *Attorney, Agent, or Firm* — Oblon, McClelland, Maier & Neustadt, L.L.P.

(57) ABSTRACT

Provided is an image processing device including a rearrangement processing unit configured to rearrange compressed image data, which is compressed by performing a wavelet transform, quantization in a predetermined unit that is based on a reference unit, and variable length encoding on image data, in wavelet levels in a frame unit.

8 Claims, 10 Drawing Sheets

FIG. 1
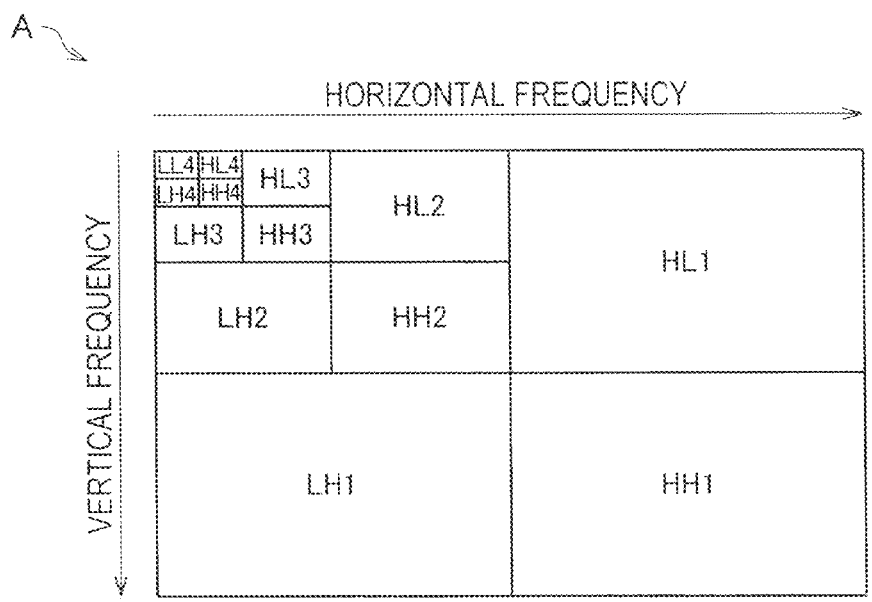

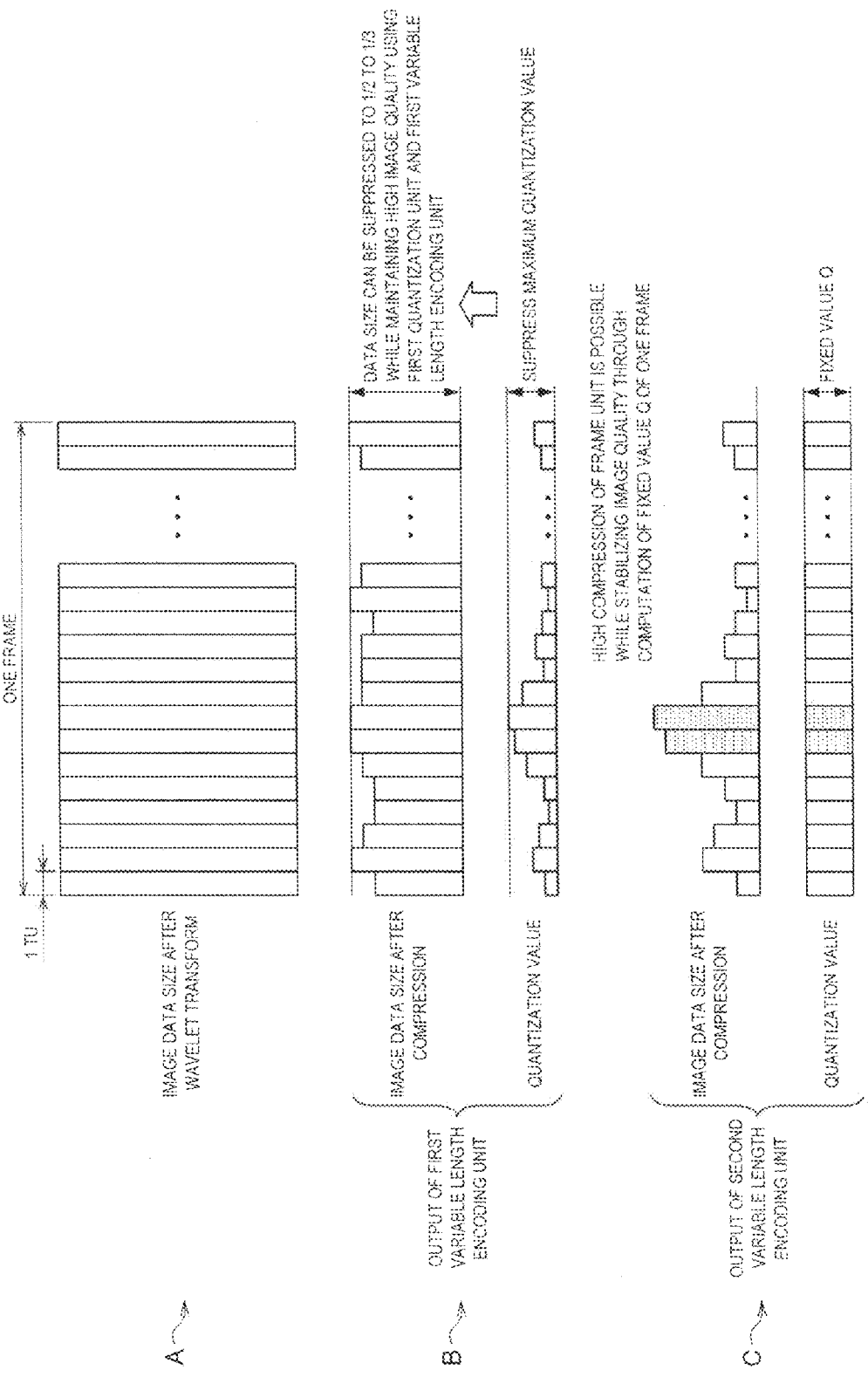

IMAGE PROCESSING DEVICE AND IMAGE PROCESSING METHOD

CROSS REFERENCE TO RELATED APPLICATIONS

This application claims the benefit of Japanese Priority Patent Application JP 2014-073033 filed Mar. 31, 2014, the entire contents of which are incorporated herein by reference.

BACKGROUND

The present disclosure relates to an image processing device and an image processing method.

Technologies for rearranging encoded image data have been developed. Technologies disclosed in JP 2000-184204A and JP 2003-169333A, for example, are exemplified as such technologies for rearranging encoded image data.

SUMMARY

When a wavelet transform is used to encode and compress image data, an image represented by the image data can be expressed hierarchically in, for example, wavelet levels. In addition, when image data which has been compressed by performing a wavelet transform, quantization in a predetermined unit and encoding on image data (which may be referred to hereinafter as "compressed image data") is decoded, there are cases in which hierarchical decoding for hierarchically decoding such an image that is hierarchically expressed as described above is performed.

The present disclosure proposes a novel and improved image processing device and image processing method that can facilitate hierarchical decoding of compressed image data.

According to an embodiment of the present disclosure, there is provided an image processing device including a rearrangement processing unit configured to rearrange compressed image data, which is compressed by performing a wavelet transform, quantization in a predetermined unit that is based on a reference unit, and variable length encoding on image data, in wavelet levels in a frame unit.

According to another embodiment of the present disclosure, there is provided an image processing method executed by an image processing device, including rearranging compressed image data, which is compressed by performing a wavelet transform, quantization in a predetermined unit that is based on a reference unit, and variable length encoding on image data, in wavelet levels in a frame unit.

According to one or more embodiments of the present disclosure, hierarchical decoding of compressed image data can be facilitated.

Note that the effects described above are not necessarily limited, and along with or instead of the effects, any effect that is desired to be introduced in the present specification or other effects that can be expected from the present specification may be exhibited.

BRIEF DESCRIPTION OF THE DRAWINGS

FIG. 1 is an illustrative diagram for describing an overview of an image processing method according to an embodiment;

FIG. 10 is an illustrative diagram showing an example of relations between sizes of image data and quantization values when an image processing device according to a second embodiment performs a process.

DETAILED DESCRIPTION OF THE EMBODIMENT(S)

Figure 2:
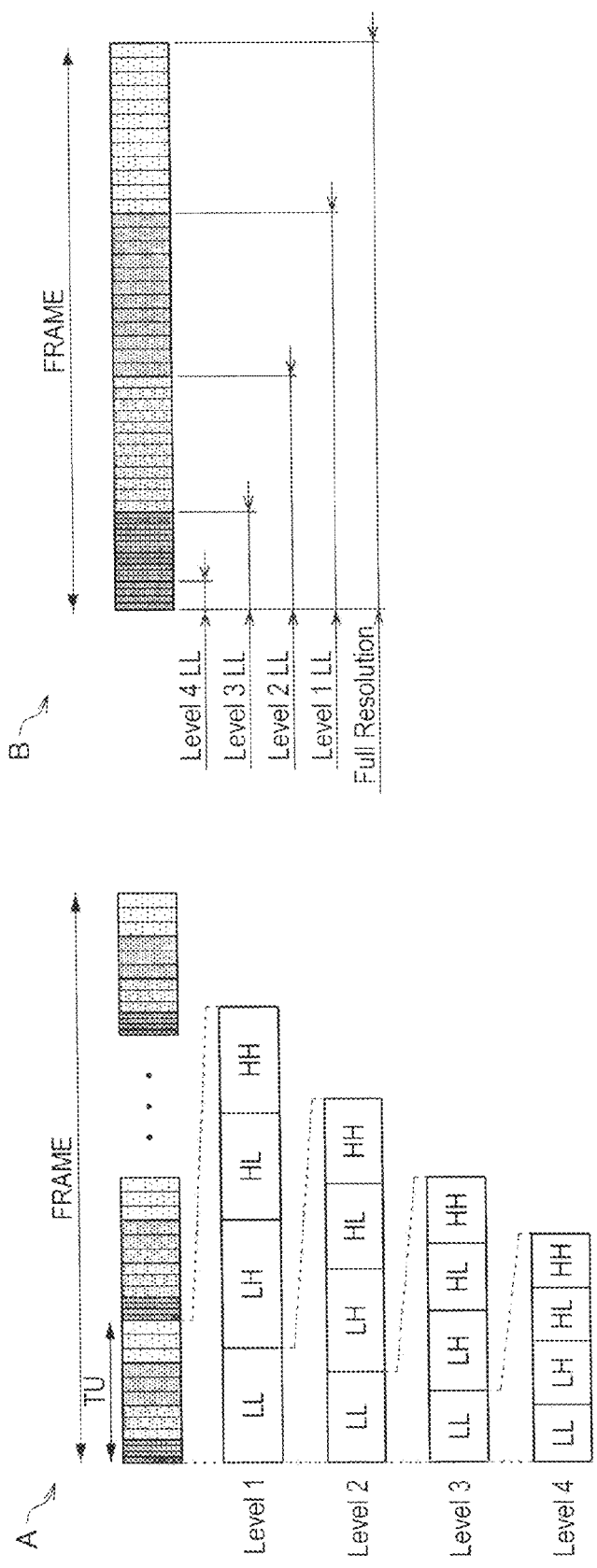
FIG. 2 is an illustrative diagram for describing rearrangement of image data in the image processing method according to the embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be provided hereinafter in the following order.

1. Image processing method according to an embodiment
2. Image processing device according to an embodiment
3. Program according to an embodiment (Image Processing Method According to an Embodiment)

Before a configuration of an image processing device according to an embodiment is described, an image processing method according to an embodiment will be first described. The image processing method according to the embodiment will be described hereinbelow mainly exemplifying a case in which the image processing device according to the embodiment performs a process relating to the image processing method according to the embodiment.

When a wavelet transform is used to encode and compress image data, an image represented by the image data is expressed hierarchically in, for example, wavelet levels.

FIG. 1 is an illustrative diagram for describing an overview of the image processing method according to the present embodiment. A of FIG. 1 represents 4-level decomposition of wavelets. In addition, B of FIG. 1 represents an example of an image expressed by the whole image (an image of full resolution; which may be referred to hereinafter as "full resolution") shown in A of FIG. 1, and C of FIG. 1 represents an example of LL (LL of level 4) shown in A of FIG. 1.

When a wavelet transform is performed, a process of decomposing image data of a processing target into high frequency components and low frequency components is performed. For example, when a wavelet transform is performed on image data of a processing target, a respective low-pass filter and high-pass filter are applied in a first direction (the vertical direction or the horizontal direction), and then the respective low-pass filter and high-pass filter are applied in a second direction (the horizontal direction or the vertical direction), and thereby the image data of the process target is decomposed into high frequency components and low frequency components.

In A of FIG. 1, the output obtained by applying the high-pass filter in the second direction to an output H obtained by applying the high-pass filter to the image data of the process target in the first direction is denoted by "HH 1," and the output obtained by applying the low-pass filter in the second direction to the output H obtained by applying the high-pass filter to the image data of the process target in the first direction is denoted by "HL 1." In addition, in A of FIG. 1, the output obtained by applying the high-pass filter in the second direction to an output L obtained by applying the low-pass filter to the image data of the process target in the first direction is denoted by "LH 1."

Here, "HH 1," "HL 1," and "LH 1" shown in A of FIG. 1 correspond to high frequency components of the image data of the process target. In addition, the output obtained by applying the low-pass filter in the second direction to the output L obtained by applying the low-pass filter to the image data of the process target in the first direction (which will be denoted hereinafter by "LL 1") corresponds to a low frequency component of image data of the process target.

Through the process described above, the process relating to a wavelet transform of level 1 is realized.

When a wavelet transform is performed, it is possible to repeatedly perform the process of decomposing the image data into high frequency components and low frequency components as described above. Hereinbelow, description will be provided exemplifying a case in which 4-level decomposition is performed as shown in A of FIG. 1.

No further process relating to a wavelet transform is performed on "HH 1," "HL 1," and "LH 1" of A of FIG. 1 which correspond to the high frequency components of the image data of the process target. On the other hand, "LL 1" which corresponds to the low frequency component of the image data of the process target is decomposed into high frequency components and low frequency components through the same process as that relating to the wavelet transform of level 1 with respect to the image data of the process target.

In A of FIG. 1, the output obtained by applying the high-pass filter in the second direction to an output H obtained by applying the high-pass filter to "LL 1" in the first direction is denoted by "HH 2," and the output obtained by applying the low-pass filter in the second direction to the output H obtained by applying the high-pass filter to "LL 1" in the first direction is denoted by "HL 2." In addition, in A of FIG. 1, the output obtained by applying the high-pass filter in the second direction to an output L obtained by applying the low-pass filter to "LL 1" in the first direction is denoted by "LH 2."

"HH 2," "HL 2," and "LH 2" shown in A of FIG. 1 correspond to high frequency components of "LL 1." In addition, the output obtained by applying the low-pass filter in the second direction to the output L obtained by applying the low-pass filter to "LL 1" in the first direction (which is denoted hereinafter by "LL 2") corresponds to a low frequency component of "LL 1."

Through the process described above, the process relating to a wavelet transform of level 2 is realized.

No further process relating to a wavelet transform is performed on "HH 2," "HL 2," and "LH 2" of A of FIG. 1 which correspond to the high frequency components of "LL 1." On the other hand, "LL 2" which corresponds to the low frequency component of "LL 1" is decomposed into high frequency components and low frequency components through the same process as that relating to the wavelet transform of level 1 with respect to the image data of the process target.

In A of FIG. 1, the output obtained by applying the high-pass filter in the second direction to an output H obtained by applying the high-pass filter to "LL 2" in the first direction is denoted by "HH 3," and the output obtained by applying the low-pass filter in the second direction to the output H obtained by applying the high-pass filter to "LL 2" in the first direction is denoted by "HL 3." In addition, in A of FIG. 1, the output obtained by applying the high-pass filter in the second direction to an output L obtained by applying the low-pass filter to "LL 2" in the first direction is denoted by "LH 3."

"HH 3," "HL 3," and "LH 3" shown in A of FIG. 1 correspond to high frequency components of "LL 2." In addition, the output obtained by applying the low-pass filter in the second direction to the output L obtained by applying the low-pass filter to "LL 2" in the first direction (which is denoted hereinafter by "LL 3") corresponds to a low frequency component of "LL 2."

Through the process described above, the process relating to a wavelet transform of level 3 is realized.

No further process relating to a wavelet transform is performed on "HH 3," "HL 3," and "LH 3" of A of FIG. 1 which correspond to the high frequency components of "LL 2." On the other hand, "LL 3" which corresponds to the low frequency component of "LL 2" is decomposed into high frequency components and low frequency components through the same process as that relating to the wavelet transform of level 1 with respect to the image data of the process target.

In A of FIG. 1, the output obtained by applying the high-pass filter in the second direction to an output H obtained by applying the high-pass filter to "LL 3" in the first direction is denoted by "HH 4," and the output obtained by applying the low-pass filter in the second direction to the output H obtained by applying the high-pass filter to "LL 3" in the first direction is denoted by "HL 4." In addition, in A of FIG. 1, the output obtained by applying the high-pass filter in the second direction to an output L obtained by applying the low-pass filter to "LL 3" in the first direction is denoted by "LH 4." In addition, in A of FIG. 1, the output obtained by applying the low-pass filter in the second direction to the output L obtained by applying the low-pass filter to "LL 3" in the first direction is denoted by "LL 4."

"HH4," "HL 4," and "LH 4" shown in A of FIG. 1 correspond to high frequency components of "LL 3." In addition, "LL 4" corresponds to a low frequency component of "LL 3."

Through the process described above, the process relating to a wavelet transform of level 4 is realized.

For example, by repeating the process of decomposing the image data into high frequency components and low frequency components as described above, 4-level decomposition of wavelets as shown in A of FIG. 1 is realized.

Here, images represented by "LL 1," "LL 2," "LL 3," and "LL 4" corresponding to the low frequency components are images each having sequentially decreasing resolution with respect to the image of full resolution shown in B of FIG. 1. In other words, when a wavelet transform is used, images represented by image data are, for example, hierarchically expressed in wavelet levels.

When compressed image data which has been compressed by performing a wavelet transform, quantization in a predetermined unit and encoding on image data is decoded, there are cases in which hierarchical decoding for hierarchically decoding such an image that is hierarchically expressed as described above is performed. By performing hierarchical decoding, it is possible to realize gradual display of an image with high resolution on a display screen, for example, after an image with low resolution is displayed on the display screen.

Here, as a method for facilitating a process of hierarchically decoding compressed image data, for example, rearranging image data that has undergone a wavelet transform at each wavelet level in units of frames is considered.

FIG. 2 is an illustrative diagram for describing rearrangement of image data in the image processing method according to the present embodiment. A of FIG. 2 shows arrangement of image data interleaved in units of TUs (Transfer Units; each of which corresponds to a unit of 16 lines, and one frame is about 140 TUs) each of which is one horizontal unit of a wavelet transform. In addition, B of FIG. 2 shows arrangement of image data realized through rearrangement of image data in the image processing method according to the present embodiment, showing arrangement of image data interleaved in units of frames.

When the data has been interleaved in units of TUs as shown in A of FIG. 2, for example, a device that performs a process of decoding compressed image data (which will be referred to hereinafter as a "decoding processing device") should perform the following processes for hierarchical decoding in order.

Collect and decode data that corresponds to LL of level 4
Collect and decode data that corresponds to LL of level 3
Collect and decode data that corresponds to LL of level 2
Collect and decode data that corresponds to LL of level 1
Collect and decode data that corresponds to full resolution When the data is rearranged in the respective wavelet levels in units of frames and interleaved in units of frames as shown in B of FIG. 2, for example, the decoding processing device can realize hierarchical decoding if the device decodes compressed image data of a process target in order. Thus, by performing rearrangement in the respective wavelet levels in units of frames as shown in B of FIG. 2, for example, hierarchical decoding of the compressed image data can be facilitated.

Further, the effect of facilitating hierarchical decoding of the compressed image data that is attributable to the rearrangement in the respective wavelet levels in units of frames becomes remarkable as the compressed image data is broadband image data with higher resolution, for example, 4K (ultra high definition (HD); 4096×2160 or the like)/480 [frame/sec], HD/1000 [frame/sec], or the like.

Figure 3:
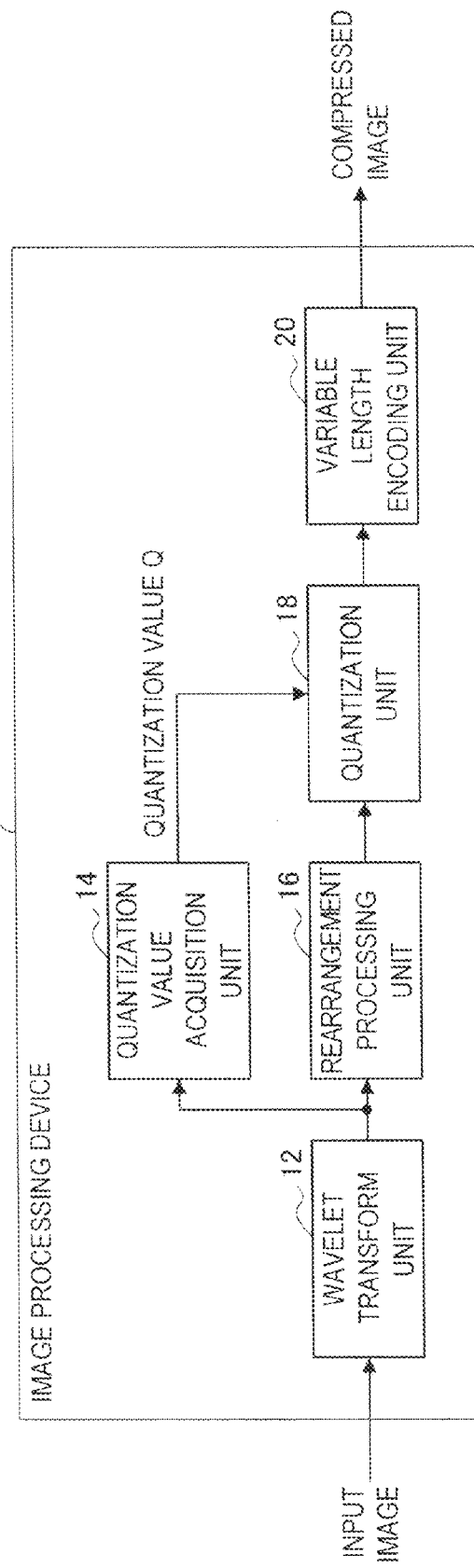
FIG. 3 is a block diagram showing an example of a configuration of an image processing device to which one method for realizing rearrangement in wavelet levels in units of frames is applied.

FIG. 3 is a block diagram showing an example of a configuration of an image processing device 10 to which one method for realizing rearrangement in the respective wavelet levels in units of frames is applied.

The image processing device 10 is provided with a wavelet transform unit 12, a quantization value acquisition unit 14, a rearrangement processing unit 16, a quantization unit 18, and a variable length encoding unit 20. In the image processing device 10, a processor that is configured by an arithmetic operation circuit, for example, a micro processing unit (MPU) or the like, plays the roles of the wavelet transform unit 12, the quantization value acquisition unit 14, the rearrangement processing unit 16, the quantization unit 18, and the variable length encoding unit 20. In addition, the wavelet transform unit 12, the quantization value acquisition unit 14, the rearrangement processing unit 16, the quantization unit 18, and the variable length encoding unit 20 may be configured by dedicated (or general-purpose) circuits that can realize processes of the respective units.

The wavelet transform unit 12 performs a wavelet transform on input image data (which may be referred to hereinafter as an "input image" or "input image data").

The quantization value acquisition unit 14 acquires a quantization value Q of each predetermined unit that is based on a reference unit, which corresponds to the wavelet-transformed image data (which may be referred to hereinafter simply as "transformed image data").

Here, a TU, for example, is exemplified as the reference unit according to the present embodiment. In addition, as the predetermined unit based on the reference unit according to the present embodiment, the reference unit itself, a plurality of reference units, one frame, or the like is exemplified. Hereinbelow, the case in which the predetermined unit according to the present embodiment is a TU will be exemplified.

The quantization value acquisition unit 14 calculates, for example, a code amount of image data transformed for each TU (an example of the predetermined unit), and then computes the quantization value Q for each TU to acquire the quantization value Q for each TU. Here, the quantization value acquisition unit 14 computes a quantization value Q that is an integer value or a quantization value Q that is a fractional value using a computing method that corresponds to a process relating to quantization performed in the quantization unit 18.

In addition, the quantization value acquisition unit 14 can also acquire a quantization value Q weighted for each level and component within the TU which corresponds to the transformed image data by referring to a quantization table in which the calculation result is stored in advance or the like. The data such as the quantization table is stored in, for example, a read only memory (ROM; which is not illustrated) or the like, and the quantization value acquisition unit 14 reads the quantization table or the like from the ROM or the like, and thereby acquires the quantization value Q weighted for each level and component within the TU.

The rearrangement processing unit 16 is provided with a memory that plays a role of a frame memory, and causes timings of the quantization value Q and the wavelet-transformed image data to match each other by delaying the wavelet-transformed image data. An amount of delay by the rearrangement processing unit 16 is set in advance. The rearrangement processing unit 16 delays the wavelet-transformed image data by the time taken by the quantization value acquisition unit 14 to acquire the quantization value (for example, a time taken to calculate a code amount).

In addition, the rearrangement processing unit 16 rearranges the image data that has been wavelet-transformed and interleaved in units of TUs as shown in, for example, A of FIG. 2 in the respective wavelet levels in units of frames as shown in, for example, B of FIG. 2.

The quantization unit 18 quantizes the image data rearranged by the rearrangement processing unit 16 based on the quantization value Q.

The variable length encoding unit 20 performs variable length encoding on the image data quantized by the quantization unit 18.

In the image processing device 10, the input image data is compressed by performing a wavelet transform, quantization, and encoding on the input image data with the configuration shown in, for example, FIG. 1. In addition, in the image processing device 10, the configuration shown in, for example, FIG. 1 realizes the image data which is obtained by performing a wavelet transform on the input image data to be rearranged in the respective wavelet levels in units of frames as shown in, for example, B of FIG. 2.

The image processing device 10, however, uses the image data that has been wavelet-transformed, i.e., wavelet-transformed non-compressed image data, as a process target to be rearranged in the respective wavelet levels in units of frames in the rearrangement processing unit 16. For this reason, in order to rearrange the image data in the respective wavelet levels in units of frames in the rearrangement processing unit 16, it is necessary for the image processing device 10 to be provided with a memory having a storage capacity in which one or more frames of wavelet-transformed non-compressed image data can be stored.

Thus, as the process relating to the image processing method according to the present embodiment, the image processing device according to the present embodiment rearranges compressed image data that has been compressed by performing a wavelet transform, quantization in a predetermined unit, and then variable length encoding on image data in the respective wavelet levels in units of frames as shown in, for example, B of FIG. 2.

Since the image processing device according to the present embodiment rearranges compressed image data in the respective wavelet levels in units of frames, the image processing device according to the present embodiment can reduce the memory necessary for rearrangement of image data to be smaller than that of the image processing device 10 which rearranges non-compressed image data, and can suppress a band of a memory necessary for rearrangement of image data more than that of the image processing device 10.

In addition, since the image processing device according to the present embodiment rearranges compressed image data in the respective wavelet levels in units of frames, hierarchical decoding of the compressed image data can be facilitated as described above. Further, the effect of facilitating hierarchical decoding of the compressed image data which is attributable to the rearrangement in the respective wavelet levels in units of frames becomes remarkable as the compressed image data is broadband image data with higher resolution, for example, 4K/480 [frame/sec], or the like as described above.

(Image Processing Device According to the Present Embodiment)

Next, examples of configurations of the image processing device according to the present embodiment which can perform the process relating to the image processing method according to the present embodiment will be described.

Image Processing Device According to a First Embodiment

Figure 4:
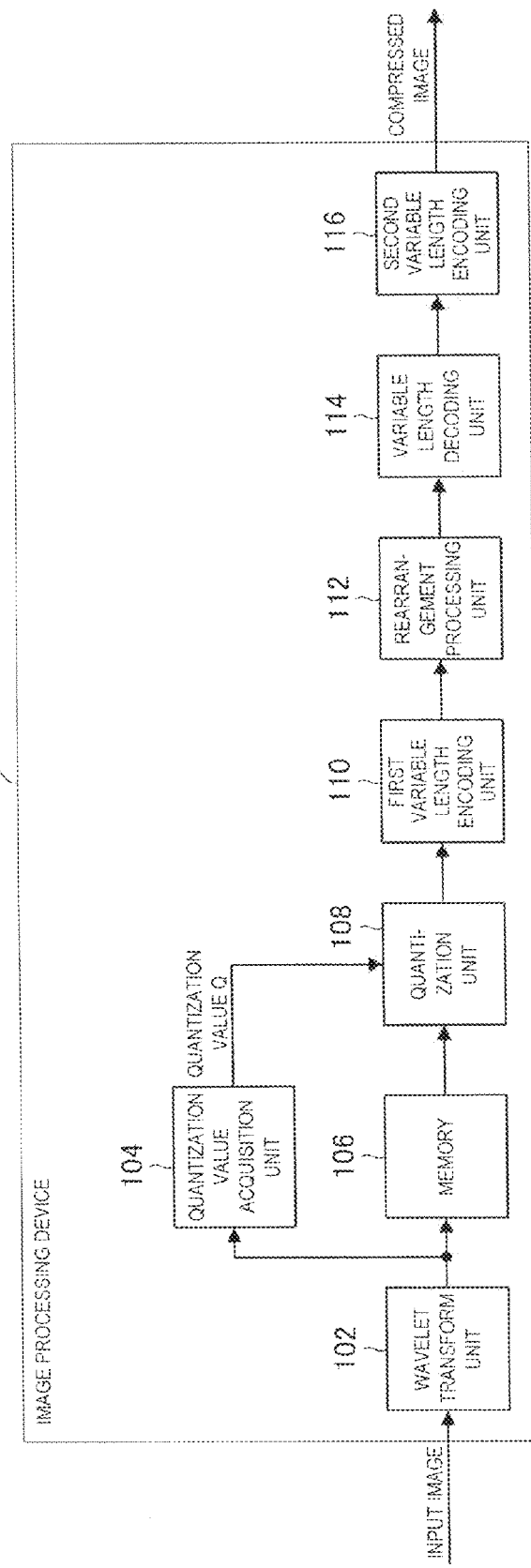
FIG. 4 is a block diagram showing an example of a configuration of an image processing device according to a first embodiment.

FIG. 4 is a block diagram showing an example of a configuration of an image processing device 100 according to a first embodiment. The image processing device 100 is provided with, for example, a wavelet transform unit 102, a quantization value acquisition unit 104, a memory 106, a quantization unit 108, a first variable length encoding unit 110, a rearrangement processing unit 112, a variable length decoding unit 114, and a second variable length encoding unit 116.

Here, in FIG. 4, the rearrangement processing unit 112 plays the role of performing the process relating to the image processing method according to the present embodiment. In addition, in FIG. 4, the wavelet transform unit 102, the quantization value acquisition unit 104, the memory 106, the quantization unit 108, and the first variable length encoding unit 110 plays the role of a compression processing unit (first compression processing unit) performing a wavelet transform, quantization in a predetermined unit, and variable length encoding to compress image data.

In addition, the image processing device 100 may be provided with, for example, a control unit (not illustrated), a ROM (not illustrated), a RAM (not illustrated), a communication unit (not illustrated) for communicating with an external device, and the like.

The control unit (not illustrated) includes, for example, a processor configured by an arithmetic circuit such as an MPU or any of various circuits, and controls the whole image processing device 100. In addition, the control unit (not illustrated) may play one or two or more roles of the wavelet transform unit 102, the quantization value acquisition unit 104, the quantization unit 108, the first variable length encoding unit 110, the rearrangement processing unit 112, the variable length decoding unit 114, and the second variable length encoding unit 116 in the image processing device 100. Note that it is needless to say that one or two or more of the wavelet transform unit 102, the quantization value acquisition unit 104, the quantization unit 108, the first variable length encoding unit 110, the rearrangement processing unit 112, the variable length decoding unit 114, and the second variable length encoding unit 116 may be configured by dedicated (or general-purpose) circuits that can realize processes of the respective units.

The ROM (not illustrated) stores programs and data for control such as arithmetic operation parameters that the control unit (not illustrated) uses. The RAM (not illustrated) temporarily stores programs executed by the control unit (not illustrated) and the like.

The communication unit (not illustrated) is a communication section provided in the image processing device 100, and plays a role of communicating with external devices via a network (or directly) in a wireless or wired manner. Here, as the communication unit (not illustrated), for example, an optical fiber connection terminal and a transmission and reception circuit, a communication antenna and a radio frequency (RF) circuit, an IEEE802.11 port and a transmission and reception circuit (for wireless communication), and the like are exemplified. In addition, as the network according to the present embodiment, for example, a wired network such as a local area network (LAN) or a wide area network (WAN), a wireless network such as a wireless local area network (WLAN) or a wireless wide area network (WWAN) via a base station, the Internet using a communication protocol such as transmission control protocol/Internet protocol (TCP/IP), or the like is exemplified.

The wavelet transform unit 102 wavelet-transforms input image data. Hereinbelow, a case in which the wavelet transform unit 102 performs decomposition into 4 levels as shown in, for example, A of FIG. 1 will be exemplified.

Here, as the input image data according to the present embodiment, for example, image data representing dynamic images (or a plurality of still images) with various kinds of resolution such as 4K, HD, and the like are exemplified. As specific examples, image data representing dynamic images with resolution of, for example, 4K/480 [frame/sec], HD/1000 [frame/sec], and the like are exemplified as the input image data according to the present embodiment.

In addition, the input image data according to the present embodiment may be image data representing, for example, RAW images, or may be a plurality of pieces of image data representing images corresponding to respective colors such as red (R), green (G), and blue (B).

As the input image data according to the present embodiment, image data generated through imaging by an imaging device, image data read from a recording medium, image data transmitted from an external device and received by the communication unit (not illustrated) or an external communication device connected thereto, and the like are exemplified. As the recording medium, for example, a magnetic recording medium such as a hard disk, a non-volatile memory such as a flash memory, and the like are exemplified.

The quantization value acquisition unit 104 acquires a quantization value Q for each predetermined unit which corresponds to transformed image data, like, for example, the quantization value acquisition unit 14 of FIG. 3. Hereinbelow, an example in which the quantization value acquisition unit 104 acquires the quantization value Q for each TU (which is an example of the predetermined unit) will be exemplified.

The memory 106 causes timings of the quantization value Q and the transformed image data to match each other by delaying the transformed image data (to match their delays). The memory 106 is equivalent to a buffer of the image processing device 100.

An amount of delay in the memory 106 is set in advance. The memory 106 delays the transformed image data by, for example, the time taken by the quantization value acquisition unit 104 to acquire the quantization value (for example, the time taken to calculate a code amount).

Here, when the quantization value Q is computed for each TU (which is an example of the predetermined unit), the memory 106 has the storage capacity equivalent to, for example, the amount of the unit of a TU (16 lines), i.e., the predetermined unit. In other words, it is not necessary for the memory 106 to have a storage capacity in which image data corresponding to one or more frames can be stored.

The quantization unit 108 quantizes the transformed image data with the quantization value Q for each TU (which is an example of the predetermined unit).

When the quantization value Q is an integer value, for example, the quantization unit 108 quantizes the image data by shifting the transformed image data to the right based on the quantization value Q and rounding the shifted image data through a set fraction process.

In addition, when the quantization value Q is a fractional value, for example, the quantization unit 108 quantizes the image data by dividing the image data transformed by the quantization value Q, and rounding the divided image data through a set fraction process.

As quantization methods, for example, the quantization unit 108 quantizes the image data using a shift arithmetic operation based on a quantization value Q that is an integer value or fractional quantization based on a quantization value Q that is a fractional value. Note that the quantization unit 108 may quantize image data through, for example, a process using an arbitrary quantization method that can quantize the image data.

The first variable length encoding unit 110 performs variable length encoding on the image data quantized with the quantization value Q for each TU (which is an example of the predetermined unit). The first variable length encoding unit 110 performs variable length encoding on the image data quantized with the quantization value Q using an arbitrary method in which variable length encoding can be performed, for example, two-dimensional variable length encoding, Huffman encoding, run-length encoding, arithmetic encoding, adaptive bit assignment, or the like.

In the image processing device 100, the input image data is wavelet-transformed, quantized in the predetermined unit, and undergoes variable length encoding, and thereby the input image data is compressed by the wavelet transform unit 102, the quantization value acquisition unit 104, the memory 106, the quantization unit 108, and the first variable length encoding unit 110.

The rearrangement processing unit 112 rearranges the compressed image data conveyed from the first variable length encoding unit 110 in the respective wavelet levels in units of frames as shown in, for example, B of FIG. 2.

(1) First Configuration Example of the Rearrangement Processing Unit 112

Figure 5:
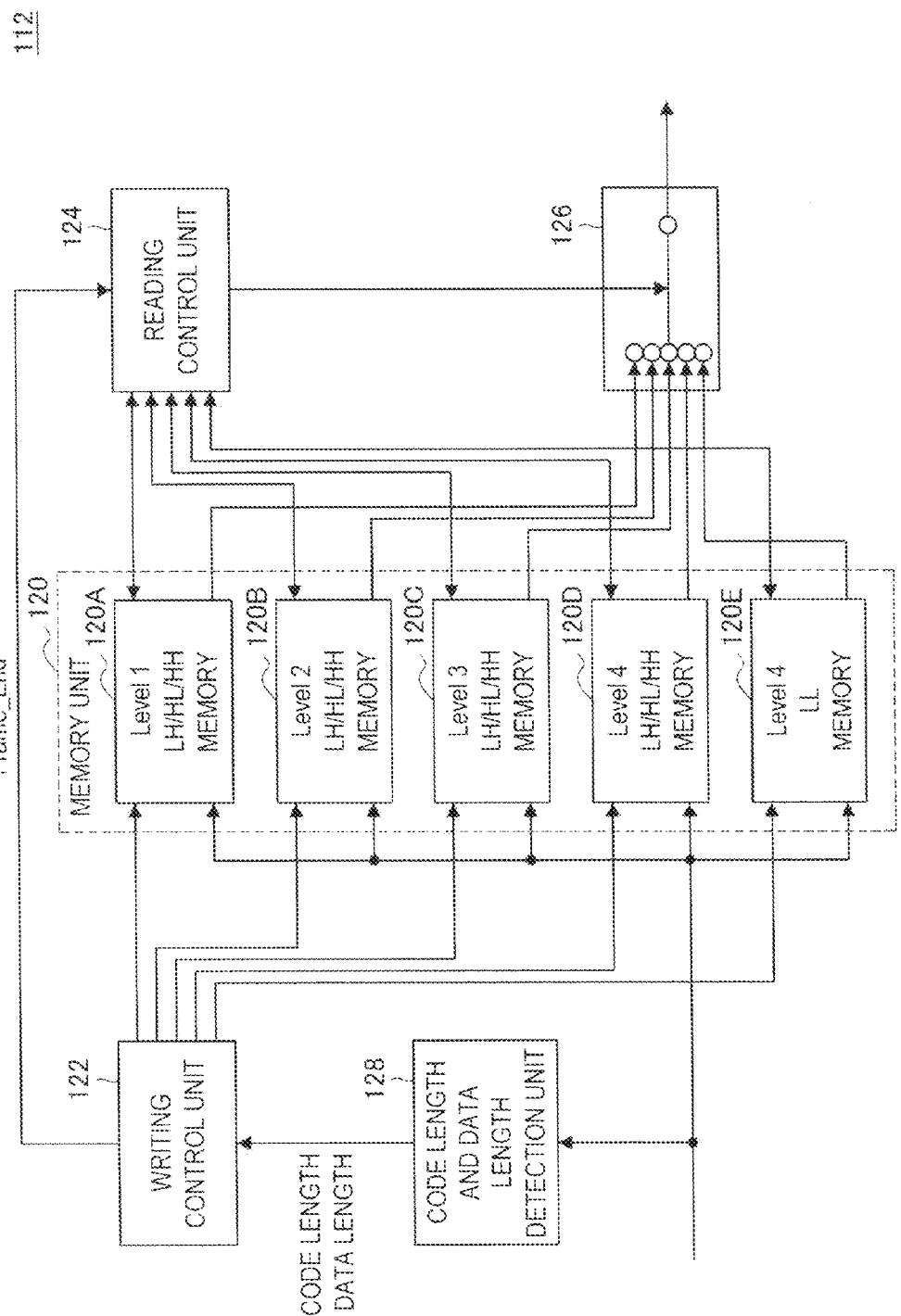
FIG. 5 is an illustrative diagram showing a first example of a configuration of a rearrangement processing unit provided in the image processing device according to the first embodiment.

FIG. 5 is a block diagram showing a first example of a configuration of the rearrangement processing unit 112 provided in the image processing device 100 according to the first embodiment.

The rearrangement processing unit 112 according to the first example is provided with, for example, a memory unit 120, a writing control unit 122, a reading control unit 124, an output unit 126, and a code length and data length detection unit 128.

Here, in the image processing device 100, a processor that constitutes the control unit (not illustrated), for example, plays the roles of the writing control unit 122, the reading control unit 124, and the code length and data length detection unit 128. In addition, in the image processing device 100, for example, one or two or more of the writing control unit 122, the reading control unit 124, and the code length and data length detection unit 128 may be configured by dedicated (or general-purpose) circuits that can execute processes of the respective units.

The memory unit 120 has a plurality of memories and hierarchically stores compressed image data in levels. In FIG. 5, a case in which the memory unit 120 is provided with five memories 120A to 120E in which the writing control unit 122 causes data shown below to be recorded is shown.

Memory 120A: A memory on which data that corresponds to "LH1," "HL1," and "HH1" is recorded.
Memory 120B: A memory on which data that corresponds to "LH2," "HL2," and "HH2" is recorded.
Memory 120C: A memory on which data that corresponds to "LH3," "HL3," and "HH3" is recorded.
Memory 120D: A memory on which data that corresponds to "LH4," "HL4," and "HH4" is recorded.
Memory 120E: A memory on which "LL4" is recorded.

When 4-level decomposition shown in A of FIG. 1 is performed, images represented by "LL1," "LL2," "LL3," and "LL4" which correspond to low frequency components are images which have descending resolution in order with respect to the image with full resolution shown in B of FIG. 1, and thus the images can be referred to as images hierarchically expressed in the wavelet levels. In addition, data stored in the memories 120D and 120E corresponds to, for example, "LL3" as shown in A of FIG. 2, and data stored in the memories 120C, 120D, and 120E corresponds to "LL2."

In addition, data stored in the memories 120B, 120C, 120D, and 120E corresponds to "LL1," and data stored in the memories 120A, 120B, 120C, 120D, and 120E corresponds to full resolution.

Thus, by recording compressed image data in the memories in the respective levels as shown in, for example, FIG. 5, the memory unit 120 hierarchically stores the compressed image data in the levels.

The writing control unit 122 causes the compressed image data to be written in the memories 120A to 120E that the memory unit 120 has based on detection results of code lengths and data lengths (code amounts) detected from the compressed image data. The writing control unit 122 causes codes (data) whose amount is equivalent to the prescribed number of pieces of data of the respective levels to be written in the memories 120A to 120E that correspond to the respective levels based on the detection results of the code lengths and the data lengths. The writing control unit 122 conveys, for example, a writing command for performing writing to the memories 120A to 120E, and thereby causes the data to be written in the memories 120A to 120E.

Here, the writing control unit 122 performs the process based on the detection results of the code lengths and the data lengths conveyed from, for example, the code length and data length detection unit 128.

Note that, when the writing control unit 122 has the same function as the code length and data length detection unit 128, i.e., the function of detecting a code length and a data length from compressed image data, the writing control unit 122 may perform the process by detecting a code length and a data length from the compressed image data. In addition, when the writing control unit 122 has the function of detecting a code length and a data length from compressed image data, the rearrangement processing unit 112 can also adopt a configuration in which the code length and data length detection unit 128 is not provided.

In addition, when the writing control unit 122 causes compressed image data of one frame to be written in the memory unit 120, the writing control unit conveys notification information indicating that the compressed image data of one frame has been written in the memory unit 120 (for example, "Frame_End" shown in FIG. 5) to the reading control unit 124. Further, the writing control unit 122 may also convey information representing the number of times of writing data corresponding to the respective levels in the memories as represented by, for example, "the number of times of writing at each level" in FIG. 5 to the reading control unit 124.

The reading control unit 124 controls reading of the compressed image data from the memory unit 120.

The reading control unit 124 causes the compressed image data to be read from the memory unit 120 based on, for example, the notification information conveyed from the writing control unit 122. In addition, when, for example, data of one frame is written with reference to the code amount written in the respective memories 120A to 120E which constitute the memory unit 120, the reading control unit 124 may cause the compressed image data to be read from the memory unit 120.

To be more specific, when the notification information is conveyed, for example, the reading control unit 124 causes the compressed image data to be read from the memory unit 120 in order of the data stored in the memory 120E ("LL4"), the data stored in the memory 120D ("LH4," "HL4," and "HH4"), the data stored in the memory 120C ("LH3," "HL3," and "HH3"), the data stored in the memory 120B ("LH2," "HL2," and "HH2"), and the data stored in the memory 120A ("LH1," "HL1," and "HH1").

As the reading control unit 124 causes the compressed image data to be read from the memory unit 120 as described above, the compressed image data is read in descending order of the wavelet levels. Thus, the compressed image data read from the memory unit 120 becomes data rearranged in the respective wavelet levels in units of frames as shown in B of FIG. 2.

In addition, the reading control unit 124 causes the data read from the memory unit 120 to be output by conveying, for example, a control signal for controlling switching of a switching circuit constituting the output unit 126 to the output unit 126.

Note that the reading control unit 124 can also cause the compressed image data to be read from the memory unit 120 based on, for example, a reading control signal conveyed from the variable length decoding unit 114 or a variable length decoding and variable length encoding unit 150 (for example, a memory reading control unit 134 provided in the variable length decoding unit 114 or the variable length decoding and variable length encoding unit 150) to be described later.

The output unit 126 is constituted by a switching circuit which connects an output terminal to any of the memories 120A to 120E constituting the memory unit 120 according to, for example, the control signal conveyed from the reading control unit 124. As the switching circuit constituting the output unit 126, a switching circuit with an arbitrary configuration that can connect the output terminal to any of the memories 120A to 120E constituting the memory unit 120 according to the control signal, for example, a switching circuit constituted by a multiplexer, a plurality of metal-oxide-semiconductor field-effect transistors (MOSFETs), and the like is exemplified.

The code length and data length detection unit 128 detects a code length and a data length from the compressed image data conveyed from the first variable length encoding unit 110, and conveys data representing the detected code length and data length to the reading control unit 122. The code length and data length detection unit 128 can detect a code length and a data length from the compressed image data using, for example, an arbitrary method corresponding to the encoding scheme in which the code length and the data length can be detected from the compressed image data.

The rearrangement processing unit 112 according to the first example rearranges the compressed image data conveyed from the first variable length encoding unit 110 in the respective wavelet levels in units of frames as shown in, for example, B of FIG. 2 with the configuration shown in, for example, FIG. 5.

Note that a configuration of the rearrangement processing unit 112 according to the first example is not limited to the configuration shown in FIG. 5.

For example, when the writing control unit 122 has the function of detecting a code length and a data length from the compressed image data, the rearrangement processing unit 112 can adopt a configuration in which the code length and data length detection unit 128 is not provided.

In addition, in the image processing device 100, the output unit 126 may not be a constituent element of the rearrangement processing unit 112 like when, for example, a switching circuit that has the same function as the output unit 126 is provided in the variable length decoding unit 114.

(2) Second Configuration Example of the Rearrangement Processing Unit 112

A configuration of the rearrangement processing unit 112 according to the present embodiment is not limited to the configuration according to the first example shown in FIG.

5 (also including the modified examples thereof). Next, as a second example of the rearrangement processing unit 112, a configuration of the rearrangement processing unit 112 when headers of the respective levels are included in the compressed image data conveyed from the first variable length encoding unit 110 will be described.

Figure 6:
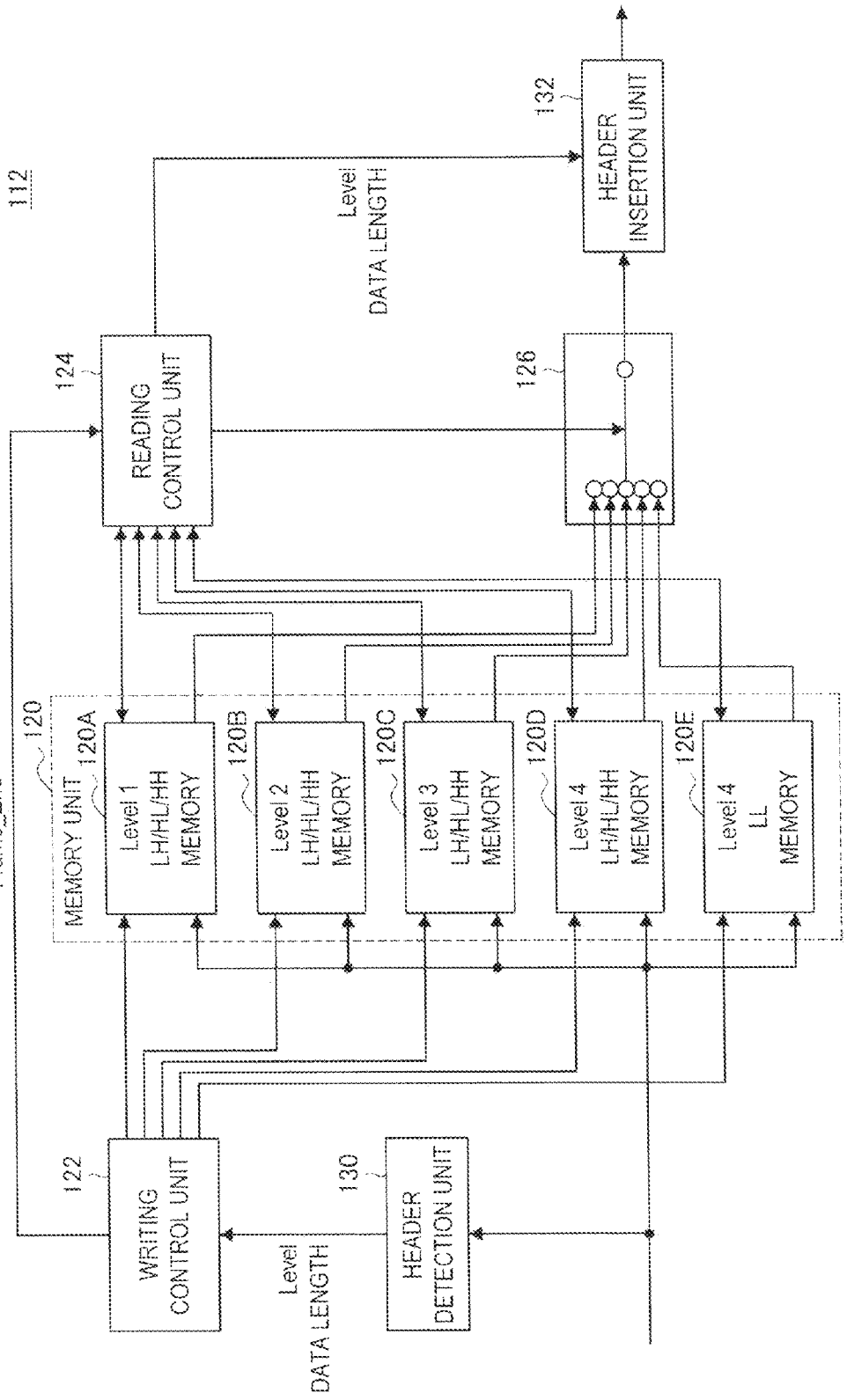
FIG. 6 is an illustrative diagram showing a second example of a configuration of a rearrangement processing unit provided in the image processing device according to the first embodiment.

FIG. 6 is a block diagram showing a second example of a configuration of the rearrangement processing unit 112 provided in the image processing device 100 according to the first embodiment.

The rearrangement processing unit 112 according to the second example is provided with, for example, the memory unit 120, the writing control unit 122, the reading control unit 124, the output unit 126, a header detection unit 130, and a header insertion unit 132.

Here, in the image processing device 100, for example, a processor constituting the control unit (not illustrated) plays the roles of the writing control unit 122, the reading control unit 124, and the header detection unit 130, and the header insertion unit 132. In addition, in the image processing device 100, for example, one or two or more of the writing control unit 122, the reading control unit 124, the header detection unit 130, and the header insertion unit 132 may be configured by dedicated (or general-purpose) circuits that can execute processes of the respective units.

The memory unit 120 has a plurality of memories as the memory unit 120 according to the first example shown in FIG. 5, and hierarchically stores compressed image data in levels. In FIG. 6, a case in which the memory unit 120 is provided with the five memories 120A to 120E in which data is recorded like the memory unit 120 according to the first example shown in FIG. 5 is shown. In other words, in the memory unit 120, the compressed image data is recorded in the memories for the respective levels and thereby the compressed image data is hierarchically stored in the levels, as in the memory unit 120 according to the first example shown in FIG. 5.

The writing control unit 122 causes the compressed image data to be written in the memories 120A to 120E that the memory unit 120 has based on data lengths for the respective levels represented by the headers included in the compressed image data. The writing control unit 122 causes codes (data) whose amount is equivalent to the prescribed number of pieces of data of the respective levels to be written in the memories 120A to 120E that correspond to the respective levels. The writing control unit 122 causes the data to be written in the memories 120A to 120E by conveying, for example, a writing command to the memories 120A to 120E.

Here, the writing control unit 122 performs the process based on data representing data lengths of the respective levels represented by, for example, the detected headers conveyed from the header detection unit 130 that detects the headers.

Note that, when the writing control unit 122 has the same function as the header detection unit 130, i.e., the function of detecting the headers from the compressed image data, the writing control unit 122 may detect the headers from the compressed image data and then perform the process. In addition, when the writing control unit 122 has the function of detecting the headers from the compressed image data, the rearrangement processing unit 112 can also adopt a configuration in which the header detection unit 130 is not provided.

In addition, the writing control unit 122 conveys notification information indicating that the compressed image data of one frame has been written in the memory unit 120 (for example, "Frame_End" shown in FIG. 6) to the reading control unit 124, like the writing control unit 122 according to the first example shown in FIG. 5. Further, the writing control unit 122 may also convey information representing the number of times of writing data corresponding to the respective levels in the memories to the reading control unit 124, like the writing control unit 122 according to the first example shown in FIG. 5.

The reading control unit 124 controls reading of the compressed image data from the memory unit 120, like the reading control unit 124 according to the first example shown in FIG. 5. Thus, the compressed image data read from the memory unit 120 becomes the data rearranged in the wavelet levels in units of frames as shown in B of FIG. 2.

In addition, the reading control unit 124 conveys an insertion command for inserting the headers and data representing data lengths of the respective levels according to reading of the compressed image data from the memory unit 120 to the header insertion unit 132 to cause the header insertion unit 132 to insert the headers corresponding to the compressed image data read from the memory unit 120 to the read compressed image data.

The output unit 126 has the same function and configuration as the output unit 126 according to the first example shown in FIG. 5, and connects an output terminal to any of the memories 120A to 120E constituting the memory unit 120 according to a control signal conveyed from the reading control unit 124.

The header insertion unit 132 inserts the data representing the data lengths of corresponding levels to, for example, the compressed image data output from the output terminal of the output unit 126 based on the insertion command conveyed from the reading control unit 124 and the data representing the data lengths of the respective levels.

The rearrangement processing unit 112 according to the second example rearranges the compressed image data conveyed from the first variable length encoding unit 110 in the respective wavelet levels in units of frames as shown in, for example, B of FIG. 2 with the configuration shown in, for example, FIG. 6.

Note that a configuration of the rearrangement processing unit 112 according to the second example is not limited to the configuration shown in FIG. 6.

When the writing control unit 122 has the function of detecting the headers from the compressed image data, for example, the rearrangement processing unit 112 can adopt a configuration in which the header detection unit 130 is not provided.

In addition, in the image processing device 100, the output unit 126 may not be a constituent element of the rearrangement processing unit 112 like when, for example, a switching circuit that has the same function as the output unit 126 is provided in the variable length decoding unit 114.

In addition, when the headers representing the data lengths of the respective levels are not used in processes in the stages after the rearrangement processing unit 112 according to the second example, or the like, the rearrangement processing unit 112 may not be provided with the header insertion unit 132. In addition, in the configuration in which the header insertion unit 132 is not provided, the function relating to insertion of headers (for example, the function of generating an insertion command or the like) may not be provided.

The image processing device 100 rearranges the compressed image data conveyed from the first variable length encoding unit 110 in the wavelet levels in units of frames as shown in, for example, B of FIG. 2 by being provided with, for example, the rearrangement processing unit 112 according to the above-described first example (also including the modified examples) or the rearrangement processing unit 112 according to the above-described second example (also including the modified examples).

The example of the configuration of the image processing device 100 according to the first embodiment will be described referring to FIG. 4 again. The variable length decoding unit 114 performs variable length decoding on the rearranged compressed image data conveyed from the rearrangement processing unit 112. The variable length decoding unit 114 decodes the image data that has undergone the variable length encoding using a variable length decoding scheme that corresponds to the variable length encoding scheme used by the first variable length encoding unit 110.

The second variable length encoding unit 116 performs variable length encoding on the rearranged compressed image data that has undergone variable length decoding.

Figure 7:
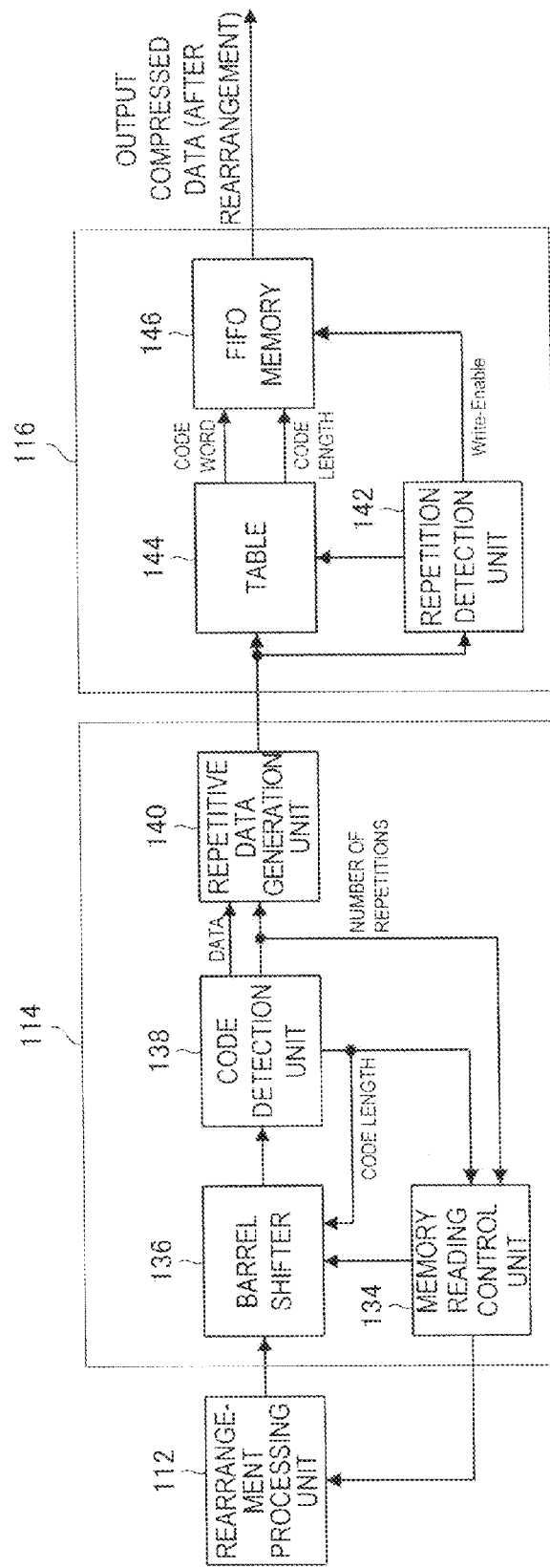
FIG. 7 is a block diagram showing an example of a configuration of a variable length decoding unit and a variable length encoding unit provided in the image processing device according to the first embodiment.

FIG. 7 is a block diagram showing an example of a configuration of the variable length decoding unit 114 and the second variable length encoding unit 116 provided in the image processing device 100 according to the first embodiment.

The variable length decoding unit 114 is provided with the memory reading control unit 134, a barrel shifter 136, a code detection unit 138, and a repetitive data generation unit 140. The variable length decoding unit 114 performs variable length decoding on the rearranged compressed image data conveyed from the rearrangement processing unit 112 using, for example, the configuration shown in FIG. 7. Note that a configuration of the variable length decoding unit 114 is not limited to the configuration shown in FIG. 7, and the variable length decoding unit 114 can adopt any configuration in which variable length decoding can be performed on the rearranged compressed image data conveyed from the rearrangement processing unit 112.

In addition, the second variable length encoding unit 116 is provided with a repetition detection unit 142, a table 144, and a first-in-first-out (FIFO) memory 146. The second variable length encoding unit 116 performs variable length encoding on the rearranged compressed image data that has undergone the variable length decoding by the variable length decoding unit 114 by having, for example, the configuration shown in FIG. 7. Note that a configuration of the second variable length encoding unit 116 is not limited to the configuration shown in FIG. 7, and the second variable length encoding unit 116 can adopt an arbitrary configuration in which variable length encoding can be performed on the rearranged compressed image data that has undergone the variable length decoding.

Note that, although FIG. 4 shows the configuration in which the image processing device 100 is provided with the variable length decoding unit 114 and the second variable length encoding unit 116 as separate units, a configuration of the image processing device according to the first embodiment is not limited to the above.

For example, instead of being provided with the variable length decoding unit 114 and the second variable length encoding unit 116, the image processing device according to the first embodiment may be configured to be provided with a variable length decoding and variable length encoding unit that realizes the functions of the variable length decoding unit 114 and the second variable length encoding unit 116 in one constituent element. In other words, the variable length decoding and variable length encoding unit according to the present embodiment has the "function of performing variable length decoding on rearranged compressed image data and variable length encoding on the rearranged compressed image data that has undergone variable length decoding."

Figure 8:
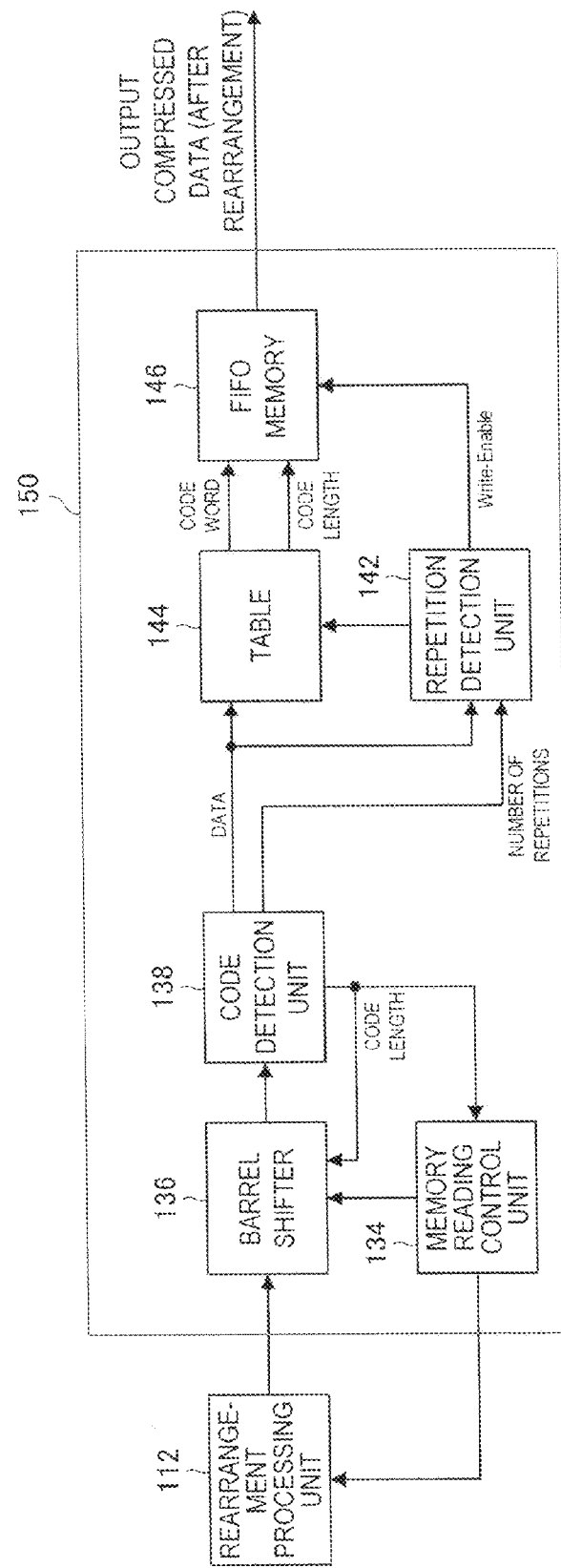
FIG. 8 is a block diagram showing an example of a configuration of a variable length decoding and variable length encoding unit provided in the image processing device according to the first embodiment.

FIG. 8 is a block diagram showing an example of a configuration of a variable length decoding and variable length encoding unit 150 provided in the image processing device according to the first embodiment.

The variable length decoding and variable length encoding unit 150 is provided with, for example, a memory reading control unit 134, a barrel shifter 136, a code detection unit 138, a repetition detection unit 142, a table 144, and a FIFO memory 146.

When the configuration of the variable length decoding and variable length encoding unit 150 shown in FIG. 8 is compared to the configurations of the variable length decoding unit 114 and the second variable length encoding unit 116 shown in FIG. 7, the variable length decoding and variable length encoding unit 150 basically has the same functions as the variable length decoding unit 114 and the second variable length encoding unit 116 shown in FIG. 7. The variable length decoding and variable length encoding unit 150, however, is not provided with the repetitive data generation unit 140 provided in the variable length decoding unit 114 shown in FIG. 7, and thus control for repetition (control relating to "the number of repetitions" shown in FIG. 7) is not necessary in the variable length decoding and variable length encoding unit 150.

Thus, when the image processing device according to the first embodiment is provided with the variable length decoding and variable length encoding unit 150 shown in FIG. 8 instead of the variable length decoding unit 114 and the second variable length encoding unit 116, the image processing device can perform variable length decoding on rearranged compressed image data and variable length encoding on the rearranged compressed image data that has undergone the variable length decoding with more simplified configuration and control. Note that a configuration of the variable length decoding and variable length encoding unit according to the present embodiment is not limited to the configuration shown in FIG. 8, and can adopt an arbitrary configuration in which the "function of performing variable length decoding on rearranged compressed image data and variable length encoding on the rearranged compressed image data that has undergone the variable length decoding" can be realized.

In the image processing device 100 according to the first embodiment, input image data is wavelet-transformed, quantized, and encoded, and thereby the input image data is compressed in, for example, the configuration shown in FIG. 4 (or the configuration in which the variable length decoding and variable length encoding unit is provided instead of the variable length decoding unit 114 and the second variable length encoding unit 116).

In addition, in the image processing device 100, rearrangement of compressed image data in the wavelet levels in units of frames as shown in, for example, B of FIG. 2 is realized in the configuration shown in, for example, FIG. 4. Therefore, the image processing device 100 can facilitate hierarchical decoding of the compressed image data.

In addition, since the rearrangement processing unit 112 that performs the process relating to the image processing method according to the present embodiment rearranges the compressed image data in the image processing device 100, rearrangement is realized by the memory with a capacity at which one frame after compression can be stored in the image processing device 100. Further, since the compressed image data is rearranged, a band of a memory relating to rearrangement may be smaller than when non-compressed image data is rearranged.

Note that a configuration of the image processing device 100 according to the first embodiment is not limited to the configuration shown in FIG. 4.

For example, the image processing device according to the first embodiment may have a configuration not including the wavelet transform unit 102, the quantization value acquisition unit 104, the memory 106, the quantization unit 108, and the first variable length encoding unit 110, i.e., a configuration not including a compressing processing unit (first compression processing unit) that compresses image data by performing a wavelet transform, quantization in a predetermined unit, and variable length encoding thereon. Even with the above-described configuration, the image processing device according to the first embodiment can perform the process relating to the image processing method according to the present embodiment using, for example, the rearrangement processing unit 112.

Thus, even with the configuration in which the compression processing unit (first compressing processing unit) is not provided, the image processing device according to the first embodiment can facilitate hierarchical decoding of compressed image data in such a way that the rearrangement processing unit 112 processes, for example, compressed image data that has undergone a wavelet transform, quantization in a predetermined unit, and variable length encoding by an external device or compressed image data recorded on a recording medium. In addition, even with the configuration in which the compression processing unit (first compressing processing unit) is not provided, a memory necessary for rearranging image data can be set to be smaller than that in which non-compressed image data is rearranged, and a band of a memory necessary for rearranging image data can be suppressed more than when non-compressed image data is rearranged.

In addition, the image processing device according to the first embodiment may adopt a configuration in which the variable length decoding unit 114 and the second variable length encoding unit 116 or the variable length decoding and variable length encoding unit is not provided. Even with the configuration in which the variable length decoding unit 114 and the second variable length encoding unit 116 or the variable length decoding and variable length encoding unit is not provided, the image processing device according to the first embodiment can perform the process relating to the image processing method according to the present embodiment using the rearrangement processing unit 112.

Thus, even with the configuration in which the variable length decoding unit 114 and the second variable length encoding unit 116 or the variable length decoding and variable length encoding unit is not provided, the image processing device according to the first embodiment can exhibit the same effect as the image processing device 100 shown in FIG. 4.

In addition, the image processing device according to the first embodiment may be provided with an imaging unit (not illustrated) that captures images (dynamic images or still images). When the imaging unit (not illustrated) is provided, the image processing device according to the first embodiment processes image data generated, for example, through capturing by the imaging unit (not illustrated).

As the imaging unit (not illustrated), for example, an imaging device constituted by lenses of an optical system, an image sensor that uses a plurality of imaging elements such as complementary metal oxide semiconductors (CMOSs), and a signal processing circuit is exemplified. The signal processing circuit is provided with, for example an automatic gain control (AGC) circuit and an analog-to-digital converter (ADC), and converts analog signals generated by the imaging elements into digital signals (image data).

Image Processing Device According to a Second Embodiment

Figure 9:
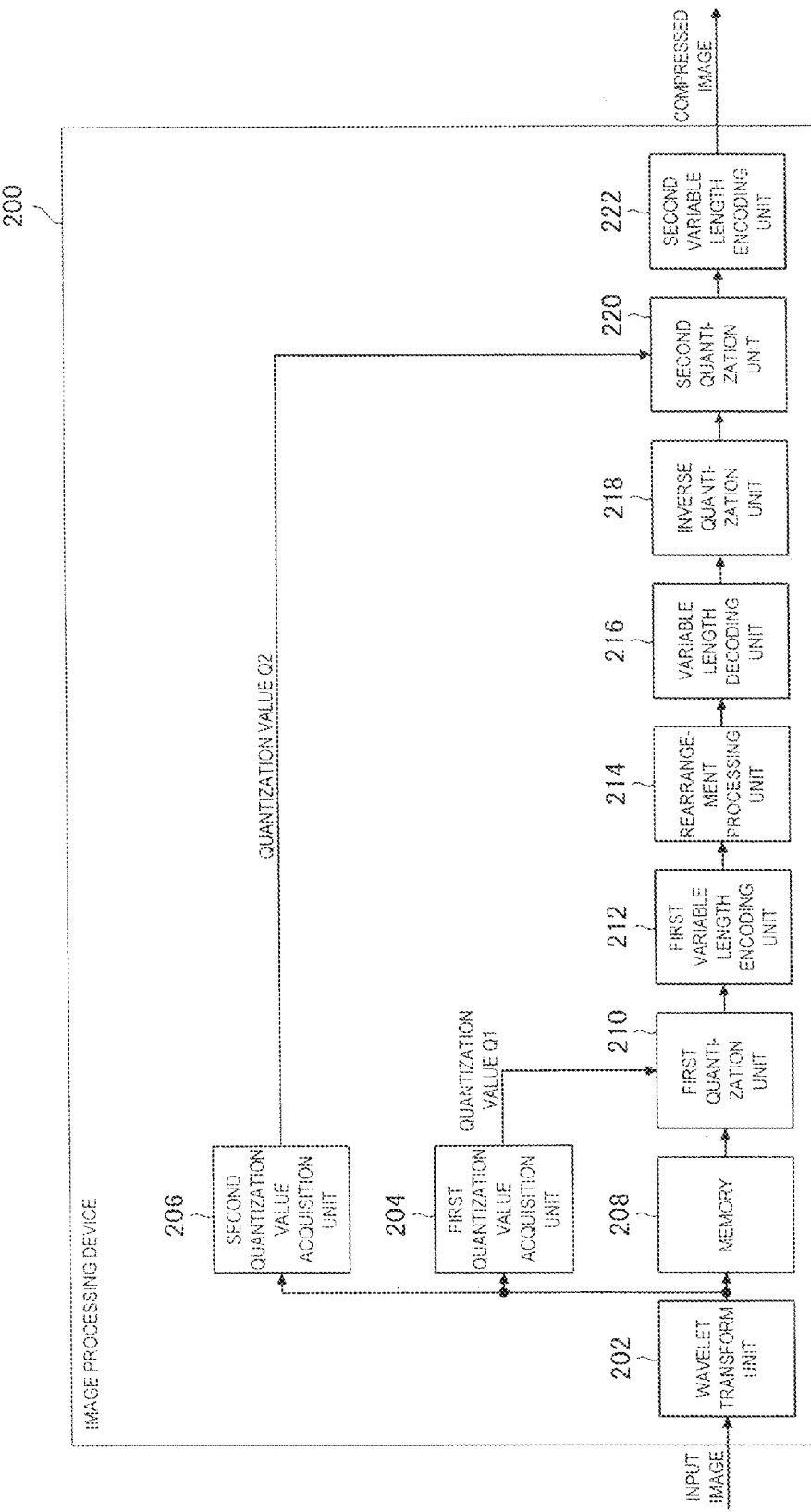
FIG. 9 is a block diagram showing an example of a configuration of an image processing device according to a second embodiment.

FIG. 9 is a block diagram showing an example of a configuration of an image processing device 200 according to a second embodiment. The image processing device 200 is provided with, for example, a wavelet transform unit 202, a first quantization value acquisition unit 204, a second quantization value acquisition unit 206, a memory 208, a first quantization unit 210, a first variable length encoding unit 212, a rearrangement processing unit 214, a variable length decoding unit 216, an inverse quantization unit 218, a second quantization unit 220, and a second variable length encoding unit 222.

Here, in FIG. 9, the rearrangement processing unit 214 plays the role of performing the image processing method according to the present embodiment. In addition, for example, the wavelet transform unit 202, the first quantization value acquisition unit 204, the memory 208, the first quantization unit 210, and the first variable length encoding unit 212 play the role of the first compression processing unit that compresses image data by performing a wavelet transform, quantization in a predetermined unit, and variable length encoding thereon in FIG. 9. Further, the second quantization value acquisition unit 206, the second quantization unit 220, and the second variable length encoding unit 222 play a role of a second compression processing unit that compresses inversely quantized image data by performing quantization in units of frames and variable length encoding thereon in FIG. 9.

In FIG. 9, the predetermined unit relating to quantization in the first compression processing unit is smaller than the frame unit relating to quantization in the second compression processing unit. Hereinbelow, a case in which the predetermined unit relating to quantization in the first compression processing unit is a TU unit will be exemplified.

In addition, in the image processing device 200 shown in FIG. 9, the wavelet transform unit 202, the first quantization value acquisition unit 204, the memory 208, the first quantization unit 210, the first variable length encoding unit 212, the rearrangement processing unit 214, and the variable length decoding unit 216 correspond to the constituent elements of the image processing device 100 shown in FIG. 4 as follows.

Wavelet transform unit 202: The wavelet transform unit 102 of the image processing device 100

First quantization value acquisition unit 204: The first quantization value acquisition unit 104 of the image processing device 100

Memory 208: The memory 106 of the image processing device 100

First quantization unit 210: The quantization unit 108 of the image processing device 100

First variable length encoding unit 212: The first variable length encoding unit 110 of the image processing device 100

Rearrangement processing unit 214: The rearrangement processing unit 112 of the image processing device 100

Variable length decoding unit 216: The variable length decoding unit 114 of the image processing device 100

In addition, the image processing device 100 may be provided with, for example, a control unit (not illustrated), a ROM (not illustrated), a RAM (not illustrated), a communication unit (not illustrated) for communicating with an external device, and the like.

The control unit (not illustrated) includes, for example, a processor configured by an arithmetic circuit such as an MPU or any of various circuits, and controls the whole image processing device 200. In addition, the control unit (not illustrated) may play one or two or more roles of, for example, the wavelet transform unit 202, the first quantization value acquisition unit 204, the second quantization value acquisition unit 206, the first quantization unit 210, the first variable length encoding unit 212, the rearrangement processing unit 214, the variable length decoding unit 216, the inverse quantization unit 218, the second quantization unit 220, and the second variable length encoding unit 222 in the image processing device 200. Note that it is needless to say that one or two or more of the wavelet transform unit 202, the first quantization value acquisition unit 204, the second quantization value acquisition unit 206, the first quantization unit 210, the first variable length encoding unit 212, the rearrangement processing unit 214, the variable length decoding unit 216, the inverse quantization unit 218, the second quantization unit 220, and the second variable length encoding unit 222 may be configured by dedicated (or general-purpose) circuits that can realize processes of the respective units.

The ROM (not illustrated) stores programs and data for control such as arithmetic operation parameters that the control unit (not illustrated) uses. The RAM (not illustrated) temporarily stores programs and the like executed by the control unit (not illustrated). The communication unit (not illustrated) is a communication section provided in the image processing device 200, and plays a role of communicating with external devices via a network (or directly) in a wireless or wired manner. Here, as the communication unit (not illustrated), for example, an optical fiber connection terminal and a transmission and reception circuit, a communication antenna and a RF circuit, an IEEE802.11 port and a transmission and reception circuit, and the like are exemplified.

The wavelet transform unit 202 has the same function as the wavelet transform unit 102 of FIG. 4, and wavelet-transforms input image data.

The first quantization value acquisition unit 204 has the same function as the quantization value acquisition unit 104 of FIG. 4, and acquires a first quantization value Q1 corresponding to transformed image data in each predetermined unit. The first quantization value acquisition unit 204 acquires the first quantization value Q1 in each unit that is smaller than a frame unit. Hereinbelow, a case in which the first quantization value acquisition unit 204 acquires the first quantization value Q1 for each TU (an example of the predetermined unit) will be exemplified.

The second quantization value acquisition unit 206 acquires a second quantization value Q2 corresponding to the transformed image data of each frame unit.

The second quantization value acquisition unit 206 computes a code amount of the image data transformed, for example, in units of frames, and thereby computes the second quantization value Q2 of the frame unit to acquire the second quantization value Q2 of the frame unit. Here, the second quantization value acquisition unit 206 computes the second quantization value Q2 of an integer value or the second quantization value Q2 of a fractional value corresponding to the process relating to quantization performed by the second quantization unit 220 to be described later.

The second quantization value acquisition unit 206 can also acquire the second quantization value Q2 that corresponds to the transformed image data which is weighted for each level and component of the frame unit, referring to, for example, a quantization table in which results of the calculation described above are stored in advance, or the like. The data such as the quantization table is stored in, for example, the ROM (not illustrated) or the like, and the second quantization value acquisition unit 206 reads the above-described quantization table or the like from the ROM or the like, and thereby acquires the second quantization value Q2 weighted for each level and component of the frame unit.

The memory 208 has the same function and configuration as the memory 106 of FIG. 4, and causes timings of the first quantization value Q1 and the transformed image data to match each other by delaying the transformed image data (to match their delays). The memory 208 is equivalent to a buffer of the image processing device 200.

The first quantization unit 210 has the same function as the quantization unit 108 of FIG. 4, and quantizes the transformed image data with the first quantization value Q1 for each TU (an example of the predetermined unit).

The first variable length encoding unit 212 has the same function as the first variable length encoding unit 110 of FIG. 4, and performs variable length encoding on the image data quantized with the first quantization value Q1 for each TU (an example of the predetermined unit).

In the image processing device 200, the input image data is wavelet-transformed, quantized in the predetermined unit, and undergoes variable length encoding, and thereby the input image data is compressed by the wavelet transform unit 202, the first quantization value acquisition unit 204, the memory 208, the first quantization unit 210, and the first variable length encoding unit 212.

The rearrangement processing unit 214 has the same function and configuration as the rearrangement processing unit 112 of FIG. 4, and rearranges compressed image data conveyed from the first variable length encoding unit 212 in the wavelet levels in units of frames as shown in, for example, B of FIG. 2.

The variable length decoding unit 216 has the same function as the variable length decoding unit 114 of FIG. 4, and performs variable length decoding on the rearranged compressed image data conveyed from the rearrangement processing unit 214. The variable length decoding unit 216 decodes the image data that has undergone the variable length encoding in a variable length decoding scheme corresponding to the variable length encoding scheme that the first variable length encoding unit 212 uses.

The inverse quantization unit 218 inversely quantizes the image data decoded by the variable length decoding unit 216. The inverse quantization unit 218 inversely quantizes the decoded image data in an inverse quantization scheme corresponding to the quantization scheme that the first quantization unit 210 uses.

When the first quantization unit 210 quantizes the image data through a shift operation based on the first quantization value Q1 of an integer value, for example, the inverse quantization unit 218 inversely quantizes the image data through a corresponding shift operation. To give a specific example, when the first quantization unit 210 quantizes the image data by shifting the transformed image data to the right based on the first quantization value Q1 of an integer value and rounding the shifted image data through a set fraction process, the inverse quantization unit 218 inversely quantizes by shifting the decoded image data to the left based on the first quantization value Q1 of an integer value and rounding the shifted image data through the set fraction process.

In addition, when the first quantization unit 210 quantizes the image data through fractional quantization based on the first quantization value Q1 of a fractional value, the inverse quantization unit 218 inversely quantizes the image data by multiplying the decoded image data by, for example, the first quantization value Q1 of a fractional value and rounding the multiplied image data through a set fraction process.

As the inverse quantization unit 218 inversely quantizes the image data decoded by the variable length decoding unit 216, the image data generated by wavelet-transforming the input image data by the wavelet transform unit 202 is restored.

The second quantization unit 220 quantizes the image data inversely quantized by the inverse quantization unit 218 with the second quantization value Q2.

Here, the second quantization unit 220 constituting the second compression processing unit quantizes the image data in, for example, the same quantization scheme as the first quantization unit 210 constituting the first compression processing unit.

Note that a quantization scheme that the second quantization unit 220 uses for quantization is not limited to the same quantization unit as the first quantization unit 210.

For example, the second quantization unit 220 may quantize the image data in a different quantization scheme from the first quantization unit 210.

The second quantization unit 220 quantizes the image data in, for example, a quantization scheme in which the image data can be compressed more than that of the first quantization unit 210. To give a specific example, the first quantization unit 210 quantizes the image data through the shift operation based on the first quantization value Q1 of an integer value, and the second quantization unit 220 quantizes the image data through fractional quantization based on the first quantization value Q1 of a fractional value.

Note that the image processing device 200 according to the present embodiment can also adopt a configuration in which image data is quantized in a quantization scheme in which the first quantization unit 210 can compress the image data more than the second quantization unit 220.

The second variable length encoding unit 222 performs variable length encoding on the image data quantized with the second quantization value Q2 by the second quantization unit 220.

Here, the second variable length encoding unit 222 constituting the second compression processing unit performs the variable length encoding on the image data in, for example, the same variable length encoding scheme as the first variable length encoding unit 212 constituting the first compression processing unit.

Note that a variable length encoding scheme that the second variable length encoding unit 222 uses for variable length encoding is not limited to the same variable length encoding scheme as the first variable length encoding unit 212.

For example, the second variable length encoding unit 222 may perform variable length encoding on the image data in a different variable length encoding scheme from the first variable length encoding unit 212. To give a specific example, the first variable length encoding unit 212 performs variable length encoding on the image data through two-dimensional variable length encoding, and the second variable length encoding unit 222 performs variable length encoding on the image data through arithmetic encoding.

Note that it is needless to say that a case in which the first variable length encoding unit 212 and the second variable length encoding unit 222 perform variable length encoding on the image data in different variable length encoding schemes is not limited to the example described above.

In the image processing device 200 according to the second embodiment, input image data is quantized and encoded, and thereby the input image data is compressed with, for example, the configuration shown in FIG. 9.

FIG. 10 is an illustrative diagram showing an example of relations between sizes of image data and quantization values when the image processing device 200 according to the second embodiment performs a process. A of FIG. 10 shows a size of wavelet-transformed image data conveyed from the wavelet transform unit 202 of FIG. 9. In addition, B of FIG. 10 shows an example of data sizes of image data that has undergone variable length encoding conveyed from the first variable length encoding unit 212 of FIG. 9 and quantization values. In addition, C of FIG. 10 shows an example of data sizes of image data that has undergone variable length encoding conveyed from the second variable length encoding unit 222 of FIG. 9 and a quantization value.

As shown in B of FIG. 10, for example, the image data that has undergone variable length encoding conveyed from the first variable length encoding unit 212 has smaller sizes that are ½ to ⅓ of the wavelet-transformed image data shown in A of FIG. 10. By reducing the size of the image data that has undergone variable length encoding conveyed from the first variable length encoding unit 212 to ½ to ⅓ of the size of the transformed image data as shown in B of FIG. 10, it is possible to suppress the first quantization value Q1 of each TU (an example of the predetermined unit) to be low, and thereby to maintain high image quality.

In addition, by reducing the size of the image data that has undergone variable length encoding conveyed from the first variable length encoding unit 212 to ½ to ⅓ of the size of the transformed image data as shown in B of FIG. 10, it is possible to suppress, for example, a band of memories (the memories constituting the memory unit 120) provided in the rearrangement processing unit 214 and a recording capacity.

In addition, because the second quantization value Q2 is acquired based on calculation of a code amount of the frame unit in the image processing device 200, it is possible to set the second quantization value Q2 to be a fixed value as shown in C of FIG. 10 even when there is unevenness in levels of difficulty of images in a frame. Thus, it is possible to maintain image quality of the image data that has undergone variable length encoding output from the second variable length encoding unit 222 while reducing the size to be smaller than that of the input image data as shown in, for example, C of FIG. 10.

Further, in the image processing device 200, the number of transforms for image data relating to compression of input image data is only one wavelet transform by the wavelet transform unit 202. Thus, since a plurality of transforms using different schemes are not performed in the image processing device 200, deterioration in image quality that would occur if a plurality of transforms were performed using different schemes does not occur. In addition, since a plurality of transforms using different schemes are not performed in the image processing device 200, a circuit scale for performing the plurality of transforms does not increase.

Thus, the image processing device 200 can achieve high image quality of an image while reducing the size of image data with, for example, the configuration shown in FIG. 9. In addition, the image processing device 200 can achieve high image quality of an image while suppressing an increase in a circuit scale with, for example, the configuration shown in FIG. 9.

In addition, the image processing device 200 realizes rearrangement of compressed image data in the wavelet levels in units of frames as shown in, for example, B of FIG. 2, like the image processing device 100 according to the first embodiment shown in FIG. 4.

Thus, the image processing device 200 according to the second embodiment can achieve facilitation of hierarchical decoding of compressed image data, like the image processing device 100 according to the first embodiment shown in FIG. 4.

In addition, the rearrangement processing unit 212 that performs the process relating to the image processing method according to the present embodiment rearranges the compressed image data in the image processing device 200, as in the image processing device 100 according to the first embodiment shown in FIG. 4. Thus, the rearrangement is realized in the image processing device 200 by the memory having a capacity in which one frame after compression can be stored, the same as in the image processing device 100 according to the first embodiment shown in FIG. 4. In addition, since compressed image data is rearranged, a band of a memory relating to the rearrangement may be smaller than when non-compressed image data is rearranged.

Note that a configuration of the image processing device 200 according to the second embodiment is not limited to the configuration shown in FIG. 9.

For example, the image processing device according to the second embodiment may be provided with an imaging unit (not illustrated). When the imaging unit (not illustrated) is provided, the image processing device according to the second embodiment processes image data generated, for example, from imaging by the imaging unit (not illustrated).

Although the image processing devices have been described above as the embodiments, the present embodiments are not limited thereto. The embodiments can be applied to various kinds of apparatuses that can process image data, for example, imaging device, computers such as personal computers (PCs) and servers, television receiver sets, communication devices such as mobile telephones and smartphones, tablet-type devices, video and music reproduction devices (or video and music recording and reproduction devices), game devices, and the like. In addition, the embodiments can also be applied to processing integrated circuits (ICs) that can be, for example, incorporated into the apparatuses described above.

In addition, the embodiments may be realized by a system composed of a plurality of devices on the premise of connection to a network (or communication between respective devices), for example, cloud computing and the like. In conclusion, the image processing devices according to the embodiments described above can also be realized as, for example, an image processing system composed of a plurality of devices.

(Program According to the Embodiments)

Hierarchical decoding of compressed image data can be facilitated as a program for causing a computer to function as the image processing devices according to the embodiments (for example, a program that can execute the process relating to the image processing method according to the embodiments such as a program for causing a computer to function as the rearrangement processing units 112 and 214) is executed by a processor or the like in the computer.

In addition, as the program for causing a computer to function as the image processing devices according to the embodiments is executed by a processor or the like in the computer, an effect exhibited by the process relating to the image processing method according to the embodiments described above can be exhibited.

It should be understood by those skilled in the art that various modifications, combinations, sub-combinations and alterations may occur depending on design requirements and other factors insofar as they are within the scope of the appended claims or the equivalents thereof.

For example, the program for causing a computer to function as the image processing devices according to the embodiments (computer program) is described as being provided above; however, a recording medium for storing the program can also be provided in the embodiments.

The configurations described above are examples of the embodiments, and of course belong to the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An image processing device including:
 a rearrangement processing unit configured to rearrange compressed image data, which is compressed by performing a wavelet transform, quantization in a predetermined unit that is based on a reference unit, and variable length encoding on image data, in wavelet levels in a frame unit.

(2)

The image processing device according to (1),
 wherein the rearrangement processing unit includes
  a memory unit configured to have a plurality of memories and hierarchically store the compressed image data corresponding to the levels,
  a writing control unit configured to control writing of the compressed image data into the memory unit, and
  a reading control unit configured to control reading of the compressed image data from the memory unit, and
 wherein the reading control unit causes the compressed image data to be read from the memory unit in descending order of the wavelet levels.

(3)

The image processing device according to (2), wherein the writing control unit causes the compressed image data to be written in the memories included in the memory unit based on a detection result of a code length and a data length detected from the compressed image data.

(4)

The image processing device according to (2), wherein the writing control unit causes the compressed image data to be written in the memories included in the memory unit based on a data length represented by each of headers included in the compressed image data of each level.

(5)

The image processing device according to (4), wherein the reading control unit adds headers representing each data length corresponding to each level to the compressed image data read from the memory unit at each level.

(6)

The image processing device according to any one of (2) to (5), wherein the writing control unit conveys notification information indicating that the compressed image data of one frame has been written in the memory unit to the reading control unit, and wherein the reading control unit causes the compressed image data to be read from the memory unit based on the notification information.

(7)

The image processing device according to any one of (2) to (6), wherein the memory unit stores the compressed image data in the memories in the levels.

(8)

The image processing device according to any one of (1) to (7), further including:

a first compression processing unit configured to compress image data by performing a wavelet transform, quantization in the predetermined unit, and variable length encoding on the image data, wherein the rearrangement processing unit processes the compressed image data compressed by the first compression processing unit.

(9)

The image processing device according to any one of (1) to (8), further including:

a variable length decoding unit configured to perform variable length decoding on the compressed image data that has been rearranged; and a variable length encoding unit configured to perform variable length encoding on the compressed image data that has been rearranged and undergone variable length decoding.

(10)

The image processing device according to any one of (1) to (8), further including:

a variable length decoding and variable length encoding unit configured to perform variable length decoding of the compressed image data that has been rearranged and variable length encoding of the compressed image data that has been rearranged and undergone variable length decoding.

(11)

The image processing device according to any one of (1) to (8), further including:

a variable length decoding unit configured to perform variable length decoding on the compressed image data that has been rearranged;

an inverse quantization unit configured to inversely quantize the image data that has undergone variable length decoding; and a second compression processing unit configured to compress the inversely quantized image data by performing quantization in a frame unit and variable length encoding on the image data, wherein the predetermined unit is a unit smaller than the frame unit.

(12)

An image processing method executed by an image processing device, including:

rearranging compressed image data, which is compressed by performing a wavelet transform, quantization in a predetermined unit that is based on a reference unit, and variable length encoding on image data, in wavelet levels in a frame unit.

What is claimed is:

1. An image processing device comprising:
circuitry configured to
rearrange compressed image data, which is compressed by performing a wavelet transform, quantization in a predetermined unit that is based on a reference unit, and variable length encoding on image data, in wavelet levels in a frame unit.

hierarchically store, in memory in the circuitry, the compressed image data corresponding to the levels;

add headers representing each data length corresponding to each level to the compressed image data read from the memory at each level:

control writing of the compressed image data into the memory based on a data length represented by each of the headers included in the compressed image data of each level; and control reading of the compressed image data from the memory in descending order of the wavelet levels.

2. The image processing device according to claim 1, wherein the circuitry is configured to cause the compressed image data to be written in the memory based on a detection result of a code length and a data length detected from the compressed image data.

3. The image processing device according to claim 1, wherein the circuitry is configured to compress image data by performing a wavelet transform, quantization in the predetermined unit, and variable length encoding on the image data, and process the compressed image data.

4. The image processing device according to claim 1, wherein the circuitry is configured to:

perform variable length decoding on the compressed image data that has been rearranged; and perform variable length encoding on the compressed image data that has been rearranged and undergone variable length decoding.

5. The image processing device according to claim 1, wherein the circuitry is configured to:

perform variable length decoding on the compressed image data that has been rearranged;

inversely quantize the image data that has undergone variable length decoding; and compress the inversely quantized image data by performing quantization in a frame unit and variable length encoding on the image data, wherein the predetermined unit is a unit smaller than the frame unit.

6. An image processing device comprising:
circuitry configured to
rearrange compressed image data, which is compressed by performing a wavelet transform, quantization in a predetermined unit that is based on a reference unit, and variable length encoding on image data. in wavelet levels in a frame unit;

hierarchically store, in memory in the circuitry, the compressed image data corresponding to the levels;

control writing of the compressed image data into the memory;

generate notification information indicating that the compressed image data of one frame has been written in the memory;

based on the notification information, control reading of the compressed image data from the memory in descending order of the wavelet levels.

7. An image processing device comprising:
circuitry configured to
rearrange compressed image data, which is compressed by performing a wavelet transform, quantization in a predetermined unit that is based on a reference unit, and variable length encoding on image data, in wavelet levels in a frame unit;

hierarchically store, in memory in the circuitry. the compressed image data corresponding to the levels;

control writing of the compressed image data into the memory;

control reading of the compressed image data from the memory in descending order of the wavelet levels, wherein the circuitry stores the compressed image data in the memory in the levels.

8. An image processing method executed by an image processing device, the method comprising:

rearranging, using circuitry, compressed image data, which is compressed by performing a wavelet transform, quantization in a predetermined unit that is based on a reference unit, and variable length encoding on image data, in wavelet levels in a frame unit;

hierarchically storing, in memory in the circuitry, the compressed image data corresponding to the levels;

adding headers representing each data length corresponding to each level to the compressed image data read from the memory at each level;

controlling writing of the compressed image data into the memory based on a data length represented by each of the headers included in the compressed image data of each level; and controlling reading of the compressed image data from the memory in descending order of the wavelet levels.

* * * * *